Figure 1:
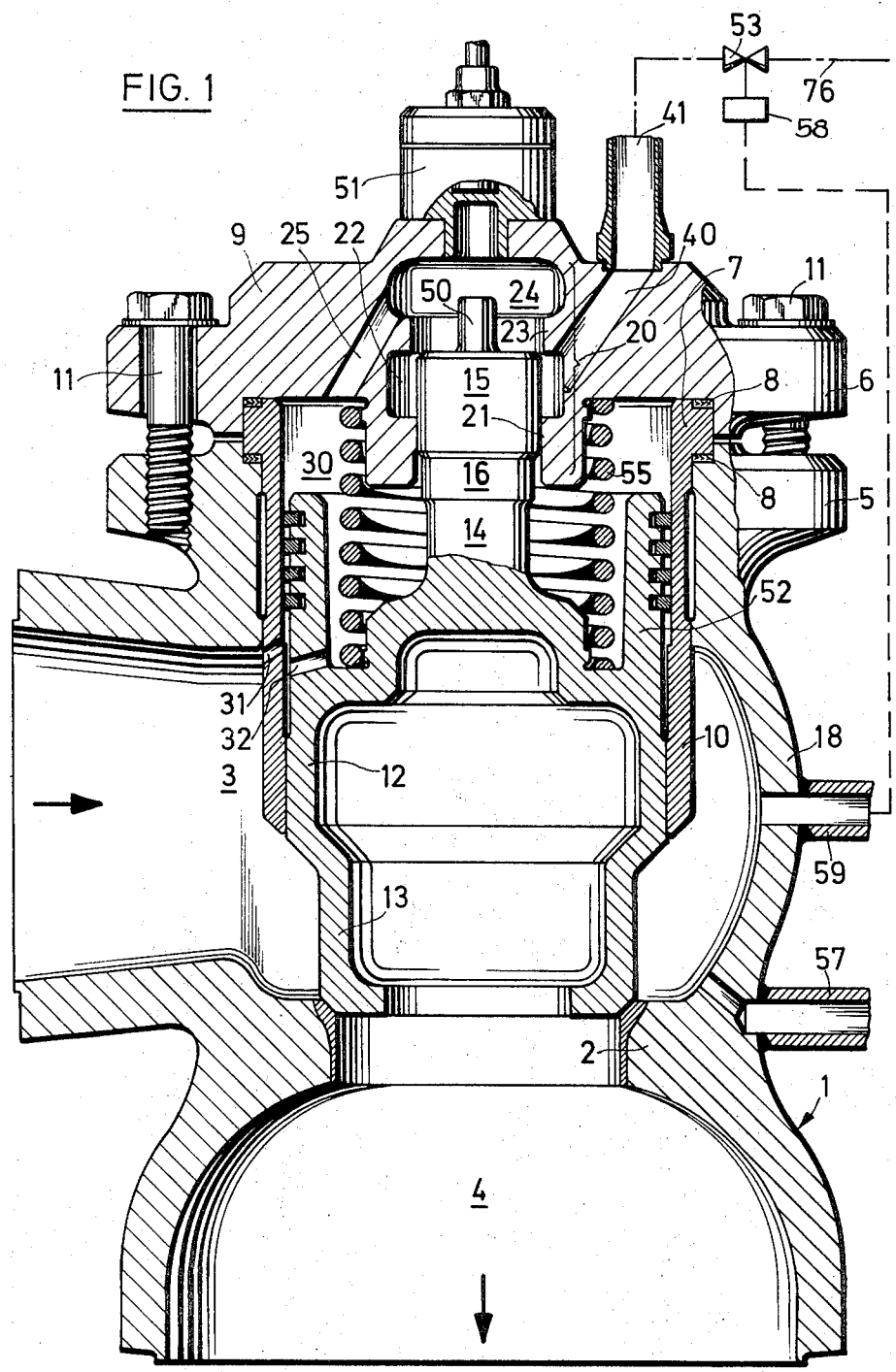

United States Patent [19]
Posipsek

[11] 3,807,438
[45] Apr. 30, 1974

[54] STOP VALVE SYSTEM

[75] Inventor: Milan Posipsek, Winterthur, Switzerland

[73] Assignee: Sulzer Brothers Ltd., Winterthur, Switzerland

[22] Filed: Apr. 9, 1973

[21] Appl. No.: 349,570

[30] Foreign Application Priority Data
Apr. 10, 1972 Switzerland.......................... 5195/72

[52] U.S. Cl............................... 137/489, 137/487.5
[51] Int. Cl............................................ F16k 31/163
[58] Field of Search ........ 137/489, 492, 492.5, 488, 137/491

[56] References Cited
UNITED STATES PATENTS
3,399,696  9/1968  Shaw............................ 137/489 X
3,557,825  1/1971  Bischoff............................ 137/489

Primary Examiner—Henry T. Klinksiek
Assistant Examiner—Robert J. Miller
Attorney, Agent, or Firm—Kenyon & Kenyon Reilly Carr & Chapin

[57] ABSTRACT

The quick opening valve is connected to a control valve means by way of a restricting means and a means to vary the cross-sectional flow area of the restricting means in dependence on the movement of the closure member of the valve. This latter means allows a first relatively large flow cross-section to occur prior to initial opening of the valve so that the valve can be quickly opened. Subsequently, a smaller flow cross-section and a following slightly larger flow cross-section are permitted to brake the movement of the closure member.

10 Claims, 2 Drawing Figures

STOP VALVE SYSTEM

This invention relates to a quick opening valve system and particularly to servopoiston-operated stop valves which are arranged to give free the flow of a fluid when required, for example when the pressure of the fluid exceeds a predetermined level. Such valves may be used for various purposes but they are used particularly for rapidly giving free large volume flows, one example being a safety valve in a nuclear reactor system.

Briefly, the invention provides a quick opening valve in a nuclear reactor system.

Briefly, the invention provides a quick opening valve system including a quick opening valve and a control valve means in which a flow cross-section between the quick opening valve and the control valve means can be varied during opening of the quick opening valve.

The quick opening valve includes an inlet and an outlet for a flow of medium, such as steam, and a closure member for sealing the inlet from the outlet in a closed position of the closure member. In addition, a cylinder is disposed within the valve and a servopiston is connected to the closure piston to move within the cylinder. The servopiston defines a space on the side remote from the closure member while being in permanent communication with the inlet, either directly or through a passage of large cross-section, on the side adjacent the closure member. At least one restriction is also provided in the valve to communicate the space remote from the closure member with the inlet. In this way, the medium is able to flow to both sides of the servopiston.

The control valve means is adapted to selectively communicate the space in the valve remote from the closure member with a region of lower pressure than that of the medium in the inlet. Upon opening of this control valve means, the medium in the space in the valve is allowed to flow out. This allows a differential pressure to occur on the servopiston and, thus, movement of the closure member from the closed position.

In order to control the flow cross-section between the quick opening valve and control valve means, a restricting means is located between each for the flow of medium along with a means for varying the flow cross-section of the restricting means in dependence on the movement of the closure member. The variance of the flow cross-section is such as to provide a first relatively large flow cross-section prior to initial movement of the closure member, a second smaller flow cross-section after initial movement and thereafter a third flow cross-section sized intermediately of the other two flow cross-sections.

The invention provides a simple technique of ensuring that, on opening, the quick opening valve first opens up a large cross-section very rapidly but that, later on in the opening movement, the closure member does not travel too fast into its end position nor springs back. Although the closure member starts to move with considerable acceleration, the effect of varying the restricting cross-section is to considerably retard the latter part of movement of the closure member. Excessive stressing of the materials is therefore avoided. This is particularly important with large valves such as those having a quick opening valve seat with a diameter of, for example, approximately 200 millimeters (mm).

Preferably, the restricting means is located in the valve casing and comprises a pilot piston connected to and extending from the servopiston; a pair of axially spaced chambers which co-operate with the pilot piston and are arranged in consecutive axial relation thereof; and a pair of annular shoulders. One of the shoulders is disposed between the chambers and is of larger diameter than the pilot piston and the other shoulder is disposed between the cylinder space remote from the closure member and the chamber adjacent the cylinder space while being of the same diameter as the pilot piston. The chamber adjacent the cylinder space is connected to the control valve means while the other chamber is connected to the cylinder space remote from the closure member.

Figure 2:
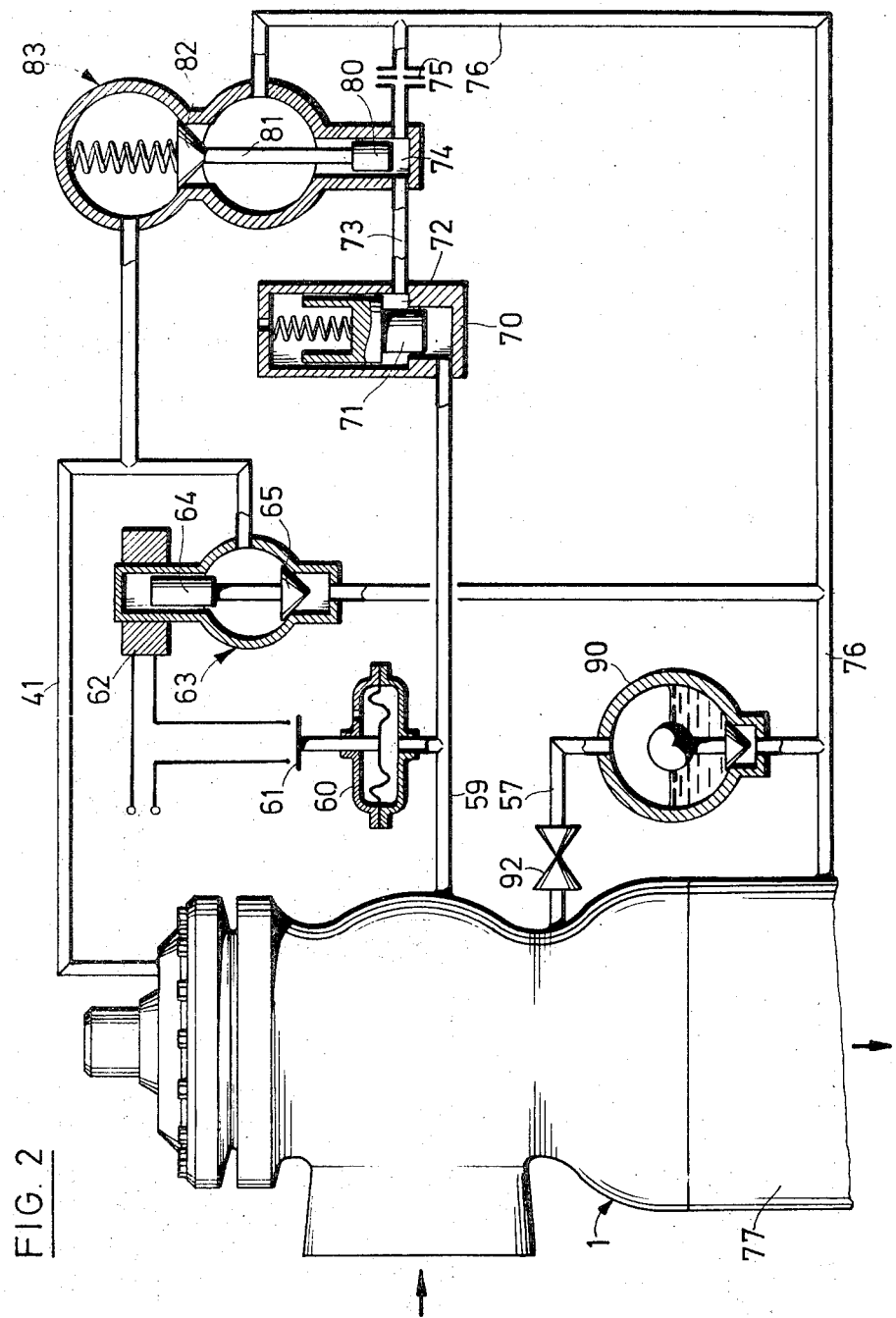

These and other objects and advantages of the invention will become more apparent from the following detailed description and appended claims taken in conjunction with the accompanying drawings in which:

FIG. 1 illustrates a cross-sectional view of a quick opening valve in closed position according to the invention; and FIG. 2 illustrates a quick opening valve and a modified control valve system according to the invention for the quick opening valve.

Referring to FIG. 1, the quick opening valve 1 has a casing 18 which is divided by a valve seat 2 into an inlet chamber 3 and an exit chamber 4. Extending into the entry chamber 3 is a cylinder 10 in which a servopiston 12 can move. The upper end of the cylinder 10 has an annular shoulder 7 which, with two sealing rings 8, is clamped between a casing flange 5 and a flange 6 of a valve casing cover 9. The two flanges 5, 6 are held together by screws 11.

The bottom end of the servopiston 12 is of reduced diameter and forms a valve closure element 13 which cooperates with the valve seat 2. The upper end of the servopiston 12 is in the form of an annular wall 52 which is provided with a substantially radial passage 32. The passage 32 co-operates with a passage 31 in the cylinder 10 to form a restrictor by means of which a cylinder space 30 remote from the closure element 13 is in continuous communication with the entry chamber 3. A spring 55 is disposed in the cylinder space 30 between the cover 9 and servopiston 12 to bias the servopiston 12 in the closing direction, i.e., against the valve seat 2.

The servopiston 12 has a central extension 14 integrally connected to a pilot piston 15 via an integral portion 16. The pilot piston 15 cooperates with two chambers 22, 24 and two annular shoulders 21, 23 which form a restricting means. The integral portion 16 is of smaller diameter than the pilot piston 15 so that the piston 15 resembles a pilot valve and has an upper edge and a lower edge which co-operates with the shoulders 23, 21. The two chambers 22, 24 co-operate with the surrounding boundary wall parts to form a valve housing 20 which is integral with the cover 9. The upper chamber 24 communicates through passages 25, only one of which is shown, in the cover 9 with the cylinder space 30, while the lower chamber 22 communicates, via a large passage 40 in the cover 9 and a line 41 connected to the cover 9, with a control valve 53. The line 41 continues beyond the valve 53 as a discharge line 76 to a lower-pressure region, e.g., to a line (not shown) connected to the exit chamber 4. The inner diameter of the shoulder 23 between the chambers 22 and 24 is larger than the diameter of the piston 15, whereas the inner diameter of the shoulder 21 between the chamber 22 and the cylinder chamber 30 is the same as the diameter of the piston 15. In a manner not shown in detail, the pressure in the entry chamber 3 of the medium to be shut off acts on the control valve 53, to which end a line 59 is connected to the casing 18 and communicates with a suitable control means 58 to deliver a signal of the pressure in the inlet chamber 3 thereto. Depending on the signal received, the control means 58 is adapted in a known manner to either maintain the control valve 53 closed or to open the control valve 53, for example, when the pressure becomes excessive in the inlet chamber 3. A line 57 is also connected to the casing 18 to drain the entry chamber 3.

The upper end of the piston 15 carries a boss 50. When the valve closure element 13 is in an open position, the boss 50 co-operates with an electrical pickoff 51 mounted on the cover 9.

The valve 1 is connected, for instance, to the live steam line of a nuclear reactor plant and serves as a safety valve. Consequently, the valve 1 must open rapidly, if a critcal live steam pressure is exceeded.

The valve 1 operates as follows. When the plant is operating normally, the valve closure member 13 is pressed against the seat 2 by the pressure of the steam in the inlet chamber 3. This pressure acts via the passages 31, 32 on that side of the piston 12 which is remote from the closure element 13. When the pressure in the inlet chamber 3 becomes excessive, the control valve 53 in the line 41 opens under the influence of the control means 58. A wave of low pressure is therefore propagated from valve 53 through line 41, passage 40, chambers 22, 24 and passages 25 into the cylinder space 30. Thus, steam flows out of the space 30 through the lines 41, 76. The pressure in the cylinder space 30 therefore drops and the servopiston 12 with the valve closure element 13 moves in the opening direction with considerable acceleration.

The passages 31, 32 are small that the pressure in the cylinder space 30 is nearer the pressure in the line 76 than the pressure in the inlet chamber 3. Because of the considerable pressure difference, the servopiston 12 reaches a high speed after covering only a short distance. When the upper edge of the piston 15 enters within the annular shoulder 23, the cross-sectional area for the steam flow from the cylinder space 30 to line 41 is reduced to a very small value since the steam must then flow from the space 30 via the spacing between the piston 15 and the annular shoulder 23 into the chamber 22. As a result, the steam is greatly restricted and acceleration decreases, finally dropping to zero. At approximately the same time, the lower edge of the piston 15 leaves the shoulder 21, so that a communication of larger cross-sectional area is restored between the cylinder space 30 and the line 41. This communication, whose magnitude depends upon the annular cross-section between the piston portion 16 and the shoulder 21, is much smaller than the previous communication via the passages 25 and the chambers 24, 22 although larger than that via the spacing between the piston 15 and shoulder 23. Consequently, the flow of steam through the gap between the piston portion 16 and the shoulder 21 is so small that the piston 12 continues to be braked until, when finally reaching its top end position, the piston 12 is moving very slowly.

In order to close the valve 1, the control valve 53 is closed. Whereafter, because of the communication provided by the passages 31, 32, the pressure in the cylinder space 30 becomes the same as in the inlet chamber 3. The closing spring 55 and the dead weight of the moving system of the valve 1 then return the valve closure member 13 to the closed position.

Referring to FIG. 2, wherein like reference characters indicate like parts as above, the single control valve 53 of FIG. 1 can be replaced by a system comprising two control valves — a first electrically operated valve 63 and a second hydraulically operated valve 83.

In the case of the electric valve 63, a pressure pickoff in the form of a load cell 60 is connected to the line 59. The load cell 60 has a contact system 61 which is included in the circuit of a winding 62, associated with an armature 64 to which a valve disck 65 is secured. Other contact systems can be arranged in the circuit of the winding 62 in parallel to the contact system 61 for other safety parameters.

In addition to the load cell 60, a limiter 70 is connected to the line. This limiter 70 is associated with the hydraulic valve 83 and comprises a spring-biased differential piston 71. An annular chamber 72 surrounding the reduced-diameter part of piston 71 communicates via a line 73 with a cylinder 74 and via a restrictor 75 with a discharge line 76 leading to a line 77 connected to the exit chamber of the stop valve 1. A small servopiston 80 in the cylinder 74 is connected by a rod to a spring-biased disk 82 of the valve 83.

The electrically operated valve 63 and the hydraulically operated valve 83 are connected in parallel between the line 41 and the discharge line 76.

When the pressure in the cell 60 exceeds a critical level, the contact system 61 closes the circuit and the winding 62 raises the armature 64 and therefore the disk 65. As a result, as previously described with reference to FIG. 1, the valve 1 opens.

Should the electrically operated valve 63 fail because of a power cut, the hydraulic valve 83 operates. In this case, the pressure in the valve 1 rises beyond the level to which the cell 60 is adjusted. As a result, at a second and higher critical level, the piston 71 of the limiter 70 moves out of the reduced-diameter portion of the cylinder. The steam then acts on the total piston area and the piston 71 moves abruptly towards its end position. The steam, therefore, acts abruptly on the small servopiston 80, which rapidly raises the disk 82 so that the line 41 is connected to the lower pressure in the discharge line 76. Thereafter, the valve 1 opens as described with reference to FIG. 1.

In the arrangement shown in FIG. 2, a condensate trap 90 is connected via a valve 92 to the drain line 57 and the output of the trap 90 is connected to the discharge line 76. The trap 90 ensures that no water can collect above the seat 2 since such water might fill the valve 1 and impair the reliability of its operation.

What is claimed is:

1. A quick opening valve system comprising a quick opening valve having an inlet and an outlet for a flow of medium, a cylinder within said valve, a valve closure member for sealing said inlet from said outlet in a closed position of said closure member, a servopiston connected to said closure member and movable mounted in said cylinder to define a space on the side of said piston remote from said closure member, said servopiston being in communication with said inlet on the side adjacent said closure member, and at least one restrictor communicating said space with said inlet; and a control valve means for selectively communicating said space with a region of lower pressure than the pressure of the medium in said inlet to cause movement of said closure member from said closed position;

a restricting means between said space and said control valve means for the flow of medium from said space to said control valve means; and means for varying the flow cross-section of said restricting means in dependence on the movement of said closure member to provide a first relatively large flow cross-section prior to initial movement of said closure member from said closed position, a second smaller flow cross-section after said initial movement and thereafter a third flow cross-section sized intermediately of said first and second flow cross-sections.

2. A valve system as set forth in claim 1 wherein said restricting means includes a pilot piston extending from said servopiston, a pair of axially spaced chambers coaxially of said pilot piston, a pair of annular shoulders, one of said shoulders being disposed between said chambers, the other of said shoulders being disposed between said space and the adjacent said space, a passage communicating said one chamber with said control valve means and means connecting the other of said chambers with said space.

3. A valve system as set forth in claim 2 wherein said servopiston and said pilot piston are integral with one another.

4. A valve system as set forth in claim 2 wherein said valve includes a valve casing having a cover and said chambers are formed in a wall of said valve casing cover.

5. A valve system as set forth in claim 1 which further comprises a closing spring in said space for biasing said servopiston towards said closed position of said closure member.

6. A valve system as set forth in claim 1 wherein said control valve means is a system comprising an electrically operated valve and, parallel thereto, a hydraulically operated valve.

7. A valve system as set forth in claim 6 wherein said electrically operated valve is responsive to a pressure of the medium in said inlet above a preset value to open said space to said region of lower pressure and said hydraulically operated valve is responsive to a pressure of the medium in said inlet further above said preset value to open said space to said region of lower pressure.

8. A valve system as set forth in claim 7 wherein said region of lower pressure is said outlet of said valve.

9. A valve system as set forth in claim 1 further comprising a trap connected to said valve inlet for drawing water therefrom where said medium is steam.

10. A valve system as set forth in claim 2 wherein said one shoulder being of an inner diameter larger than a diameter of said pilot piston and the other shoulder being of an inner diameter equal to said pilot piston diameter.

* * * * *